United States Patent
Toney

(10) Patent No.: US 6,397,514 B1
(45) Date of Patent: Jun. 4, 2002

(54) ANIMAL TRAP

(76) Inventor: James Toney, 730 Cheyenne Creek Dr., Lake George, CO (US) 80827

( * ) Notice: Subject to any disclaimer, the term of this patent is extended or adjusted under 35 U.S.C. 154(b) by 0 days.

(21) Appl. No.: 09/083,413

(22) Filed: May 22, 1998

Related U.S. Application Data

(60) Provisional application No. 60/047,519, filed on May 23, 1997.

(51) Int. Cl.$^7$ .................. A01M 23/02; A01M 23/08
(52) U.S. Cl. .................................... 43/58; 43/65
(58) Field of Search ................ 43/58, 100, 101, 43/64, 65, 66, 69

(56) References Cited

U.S. PATENT DOCUMENTS

| | | | | |
|---|---|---|---|---|
| 590,723 A | * | 9/1897 | Hargan | 43/64 |
| 592,598 A | * | 10/1897 | Voras | 43/65 |
| 848,765 A | * | 4/1907 | Pemberton | 43/69 |
| 872,556 A | * | 12/1907 | Carwile | 43/100 |
| 1,218,589 A | * | 3/1917 | Benoit | 43/69 |
| 1,381,203 A | * | 6/1921 | Kuwik | 43/100 |
| 1,453,135 A | * | 4/1923 | Hermanson | 43/100 |
| 1,538,308 A | * | 5/1925 | Taylor | 43/69 |
| 1,684,564 A | * | 9/1928 | Toppe | 43/100 |
| 1,985,177 A | * | 12/1934 | Lawrence | 43/100 |
| 2,602,261 A | * | 7/1952 | Mann | 43/100 |
| 4,030,229 A | * | 6/1977 | Sale | 43/69 |
| 4,034,693 A | * | 7/1977 | Challenger | 43/100 |
| 4,916,851 A | * | 4/1990 | Pedersen | 43/101 |

* cited by examiner

Primary Examiner—Kurt Rowan
(74) Attorney, Agent, or Firm—Joe D. Calhoun

(57) ABSTRACT

An improved animal trap apparatus for capturing prey without injuring same, comprised of an upper enclosure means of light weight and flexible netting or mesh material supported by poles or rods arranged in a self-supporting manner.

1 Claim, 3 Drawing Sheets

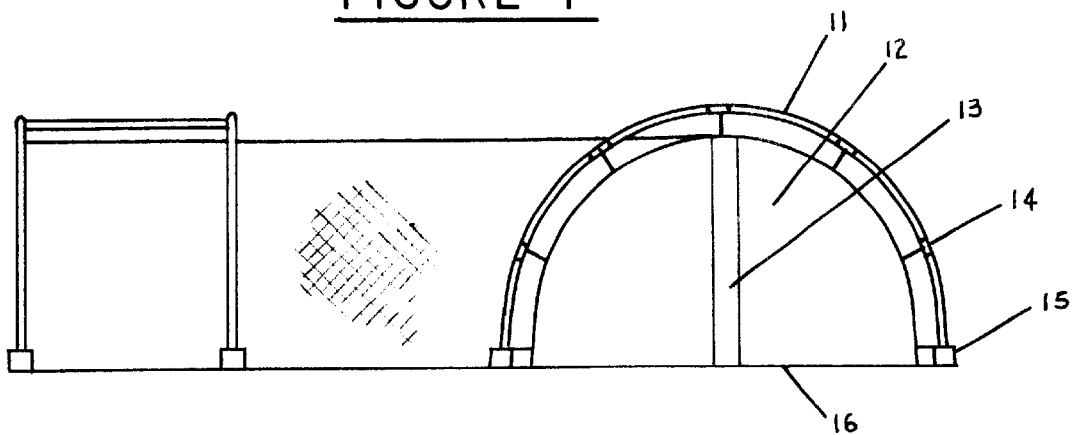
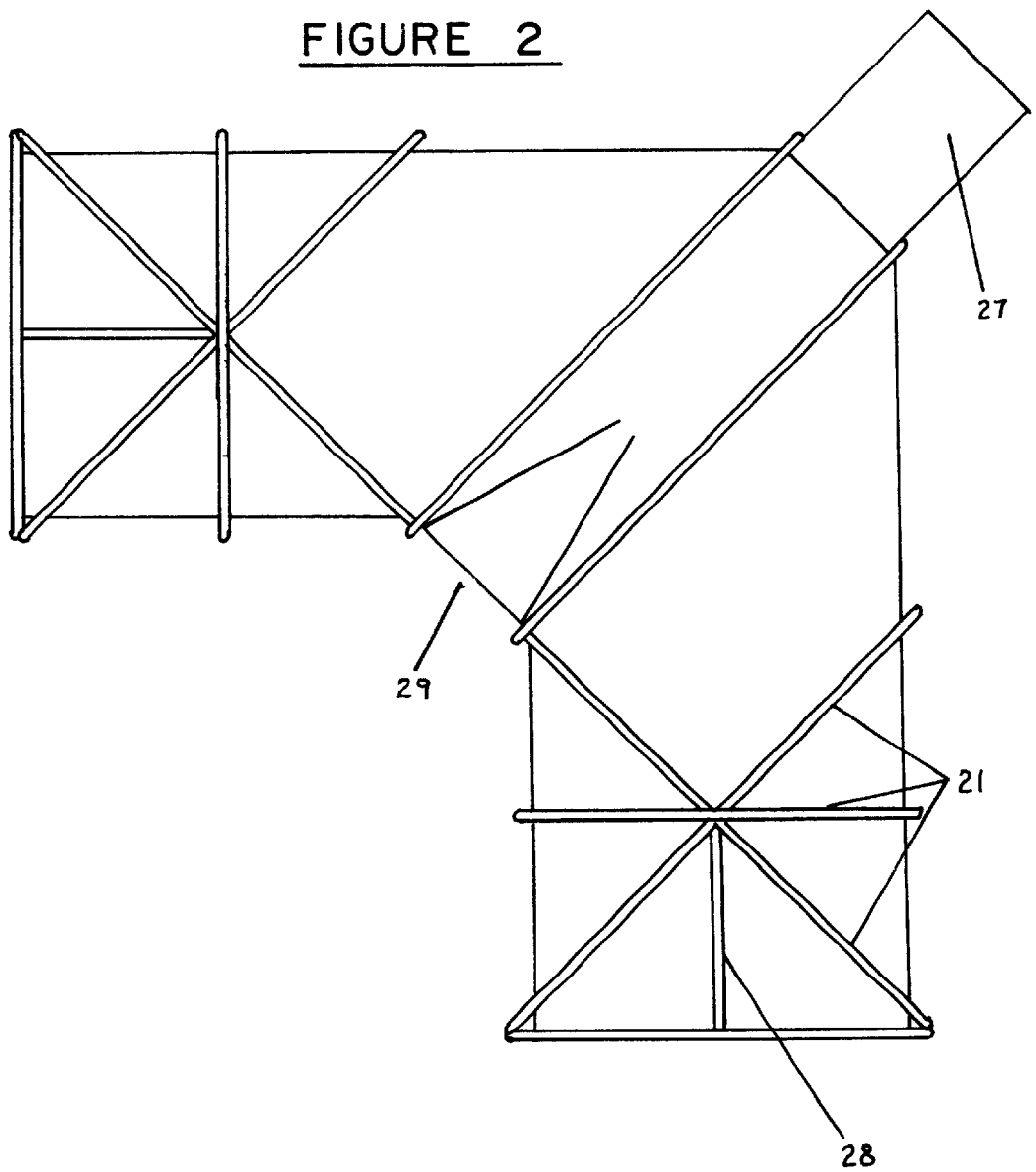

ANIMAL TRAP

This application is filed within 12 months after the May 23, 1997 filing of its prior copending provisional application Ser. No. 60/047,519.

BACKGROUND OF THE INVENTION

This invention relates to the field of traps for capturing animals. The industry has heretofore had a great need for a trap that is light weight, easy to assemble and disassemble, and effective in capturing and detaining the desired type of animal without injuring said prey. The present invention satisfies the industry needs, among other demands.

The animal traps currently used are often heavy, bulky and difficult to transport to inaccessible areas and to assemble in the field. Many such traps are essentially wire cages configured around a frame of tubular metal.

Many traps are needed for capturing animals in such a manner as to optimize the prey's health. Many of the traps currently used injure or kill the prey as it attempts to escape. It is therefore often necessary to capture a great many more animals than would be trapped using the invention disclosed herein.

SUMMARY OF THE INVENTION

The inventor has discovered that relatively new materials and designs may be used to make a trap that is light weight, easy to assemble and disassemble, and effective in capturing and detaining animals without injuring said prey.

At first blush, the present invention might seem to resemble a variation of a backpacker's "dome tent," in that one version of the invention described herein is comprised essentially of a nylon net or mesh fabric supported by fiberglass or nylon poles held in an inverted U shape. It should be noted that, although the appearance of both such items might be superficially similar, the purposes served by each of the respective items are diametrically opposite. On the one hand, the dome tent is intended to repel the outside elements to protect humans within, and to also allow such humans to come and go freely; the dome tent is opaque, and designed to shield out weather elements while maximizing ingress and egress by humans. By contrast, the invention is intended to detain the desired type of animal, especially waterfowl, while allowing said prey to remain in the natural elements; the animal trap is essentially see-through, and its entrance is designed to be an essentially 1-way-only route.

One object of the invention is to provide a trap that is light weight, that can easily be transported to inaccessible areas. Another object of the invention is to provide a trap that is easy to assemble and disassemble. It is another object of the invention to provide a trap capable of capturing and detaining its prey without causing injury to it. Other objects of the invention are apparent from the four corners of this application.

DESCRIPTION OF THE DRAWINGS

FIG. 1 depicts an elevational view of an L-shaped embodiment of the invention wherein one end of a first [one] leg of the L appears as an inverted U, and with a second [the other] leg of the L [leg] in the background (partially obstructed by the first [other] leg of the L). Depicted are: support members (11); upper enclosure means (12) comprising essentially transparent mesh or netting (depicted by patches of cross-hatched areas); overlapping enclosure means (13) forming a closed openable entrance for human ingress and egress; attachment means (14); anchor means (15); and the perimeter of flooring (16).

FIG. 2 depicts a top view of an [the] L-shaped embodiment, with the enclosure means essentially transparent (depicted by patches of cross-hatched areas. Depicted are: support members (21); prey catch box (27); prey entrance (29); and ceiling support means (28) attached to apex of support means.

DETAILED DESCRIPTION OF THE INVENTION

Figure 3:
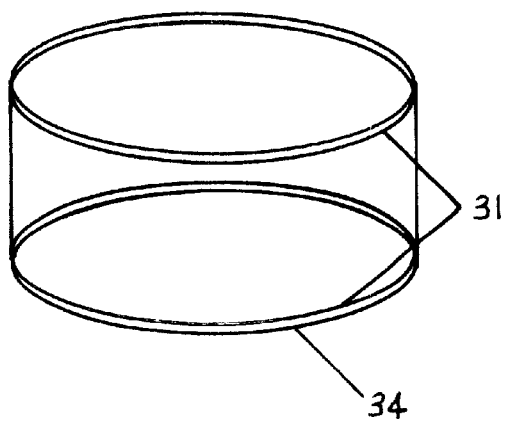
FIG. 3 depicts a perspective view of a cylindrical embodiment, with the enclosure means essentially transparent (although not depicted by patches of cross-hatched areas). Depicted are: support members (31); and enclosure support attachment means (34).
Figure 4:
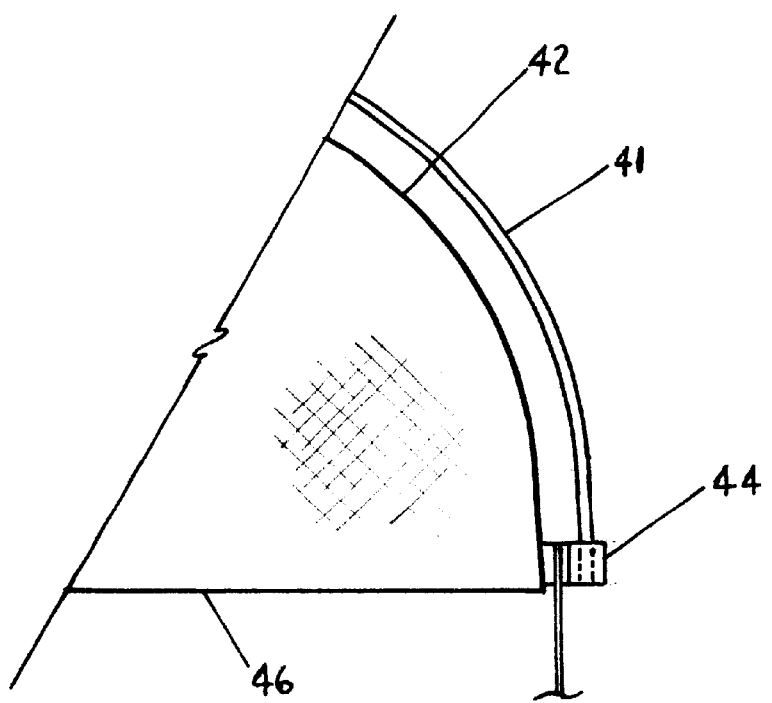
FIG. 4 depicts, for at least one embodiment of the invention, in partial view the relationship of the support attachment means to a support means inserted therein, and the assembly's relationship to the enclosure means. Depicted are: support members (41); enclosure means (42); support attachment means (44); and flooring (46).
Figure 5:
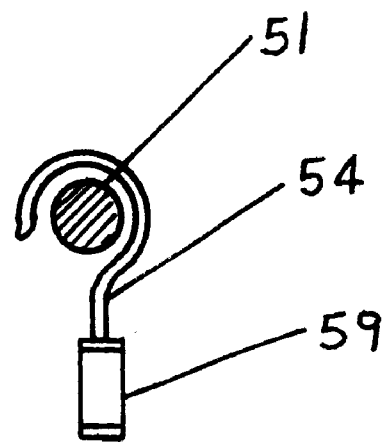
FIG. 5 depicts, for at least one embodiment of the invention, in partial view, the relationship of the enclosure-support attachment means to the support means and the enclosure means. Depicted are: support member (51) in cross section; an enclosure support attachment means (54), such as a snap-on hook; and a strap (59) connecting said hook to said enclosure member.

In general, the improved animal trap apparatus is comprised of upper enclosure means, preferably comprised of an essentially light-weight, flexible and see-through material such as (for example) nylon mesh or other netting material, that forms an interior enclosure cavity when it is attached to or otherwise supported by a plurality of elongate support members such as (for example) nylon or fiberglass poles or rods. Such supported enclosure may also be anchored to substratum such as (for example) earth, water and/or any flooring material, to hold the trap apparatus in the desired location and/or to prevent escape of prey trapped therein.

Upper Enclosure Means

The upper enclosure means may be constructed of any material able to form an inner enclosure cavity when supported by support members, having sufficient strength to prevent the exit or escape of prey trapped within the cavity. The upper enclosure means may have any size of surface area sufficient to form a cavity having the necessary or desired size. The upper enclosure means ideally has a regular perimeter, perhaps reinforced, adapted for suitable anchoring to substatum.

Support Members

The support members may be constructed of any material able to support the weight and arrangement of an enclosure means, to thereby form an inner enclosure cavity defined by said enclosure means; the support members should also have sufficient strength and stability to withstand windy or stormy weather when in use, so that the trap apparatus does not collapse.

Support members such as support poles may have unitary design construction, being essentially a single member without subparts. Alternatively, such support poles may be comprised of a plurality of shorter sub-poles, each connected end-to-end with another sub-pole until the desired length is acheived; although there are many known means of attaching such sub-poles, one such attachment means is comprised of fastening a cylindrical collar to the first end of each sub-pole, the collar being designed with sufficient length and diameter to fasten essentially permanently to the first end while having sufficient collar length and diameter to accept wedgeable insertion of a second end of a sub-pole for a snug fit.

The support members may be made out of any materials appropriate to accomplish the goals dictated by the particular design of the particular embodiment of the invention. Such support members may be comprised of essentially straight and rigidly flexible material, making it necessary that each opposing end of each member be fixed (relative to the other opposing end) in such a manner as to essentially bow such member to thereby provide arching support for the enclosure material. Alternatively, support members may be constructed of firmly rigid material and designed with the appropriate curvature or angle(s) to provide the desired cavity-forming support.

Support members may be separate and independant from each other, or they may be criss-crossed with or otherwise in contact with one or more other support members for desired strength, stability or design features.

Enclosure-Support Attachment Means

The enclosure material may be attached to the support members by any means. The preferred means consists of those which may allow easy attachment without correspondingly easy detachment. Such means include (without limitation) clamps, hooks, hooks with corresponding eyelets and tubes. The support members may be external and/or internal to the enclosure material.

Anchor Means

It is often necessary or desireable to anchor the enclosure means and/or one or more support members to substratum. This is usually desireable in the embodiments of the invention having only a mesh roof, without any flooring. Means of anchoring the enclosure means to flooring material include (for example) any appropriate means of fastening the perimeter of the enclosure means at close intervals to the perimeter of the flooring material, including (without limitation) stitching, stapling and/or gluing. With respect to means for anchoring the enclosure means and/or support member(s) to earth, such anchor means may be comprised of (for example) one or more stakes fastened to the enclosure material and/or one or more support members, and driven securely into the ground. Anchor means for anchoring opposing ends of support poles to flooring material may be comprised of (for example) fastening a cylindrical collar, such as that described above for fastening sub-poles end-to-end, at strategic locations of the flooring floorplan such as (for example) at corners of functional units described hereinbelow; each opposing end of a support pole is then inserted into a collar fixed at the appropriate location to facilitate the formation of a functional support unit.

In the version of the invention especially well suited for inclusion of flooring material, such as a mesh floor similar to the mesh roof, the substratum may be water and the anchor means may be comprised of any means able to hold the trap apparatus in a particular region of such water. Such anchor means may include weight attached to the trap apparatus, either directly or via cord or similar connecting means, to provide the desired continuity with immobile elements beneath such water; alternatively, such anchor means may include stakes driven into the substratum through loops in the trap material.

Another version of the invention is a floating trap apparatus adapted for use in deeper water. This version includes adding flotation means to the trap apparatus, especially to the perimeter of the enclosure material and/or any flooring material. Such flotation means are comprised of (for example) inflatable tube design incorporated into the design of the trap apparatus or flotation material incorporated into the design of the trap apparatus.

Flooring Means and Floorplan Shape

Although the trap may be comprised of only a supported and anchored mesh "roof," as when opposing ends of each support rod are anchored in such a way as to form an essentially inverted "U" shape, the trap may also have a "floor" comprised of similar materials or different materials, depending upon the precise needs of the situation.

Regardless of whether the invention has flooring material, it may have almost any shape needed or desired, depending on the design of the supported enclosure means forming essentially self-supporting functional units. The trap apparatus may have a floorplan or "footprint" on the substratum, in the shape of a square or rectangle, the four corners of which may be formed by the opposite ends of a pair of support members; greater stability and support is acheived by criss-crossing each pair of support members, and perhaps even fastening the paired support members at the criss-cross. This design may achieve a 4-legged functional unit The floorplan may also have a hexagonal shape, the six corners of which are formed by the opposite ends of three support members, which likewise may be criss-crossed and fastened like the 4-cornered functional unit; this arrangement has also been found to add stability and strength to the trap apparatus, and like its 4-legged counterpart may function alone as an animal trap or as a functional unit in conjunction with one or more other functional units as an expanded animal trap. The floorplan may also have an octagonal shape, the eight corners of which a re formed by the opposite ends of four support members; like its counterparts, this 8-legged version may function alone as an animal trap or as a functional unit in conjunction with one or more other functional units as an expanded animal trap.

Other shapes may be achieved by other combinations of support members, or by the combination of one or more other functional units of the invention. As an example, a plurality of such square or rectangular 4-legged units may be arranged adjacent to or in cooperation with one another, to expand the floorplan of the trap apparatus by lengthening it or by creating angular floorplans. It has been found that a floorplan in the shape of a boomerang or "L" shape is particularly stable in windy or uneven terrain. Another configuration is essentially cylindrical.

1-Way-Only Entrance Means

The enclosure means is also comprised of at least one 1-way-only entrance whereby prey may enter the enclosure cavity without being able exit. Said entrance may be a break or hole in the enclosure material, thereby defining a mouth of an entrance passageway continuing into the enclosure cavity as an increasingly narrowing tunnel or throat extending into the cavity. Said throat may be comprised of any material, but is preferably comprised of material similar to the enclosure material. The throat may also have support members, such as arching members similar to the support members, that are either free standing or appropriately anchored into the substratum. The exterior mouth of the entranceway may also be equipped with means of preventing exit of the prey out of the trap; such means might include projections surrounding the mouth of the entranceway and oriented in such a fashion so as to protrude only down into the tunnel and towards the enclosure cavity, to thereby prevent the prey form reversing its direction and exiting the entrance.

Human Entrance Means

The improved animal trap may also be comprised of an entrance for human use. Such entrance means may be a closable slit in the enclosure material. It may alternatively be comprised of overlapping end segments of enclosure material fitted with elastic or similar border material capable of allowing the usually closed entrance to open and then return to the normally closed position.

Prey Catch Box Means

The enclosure means is also comprised of at least one 1-way-only exit whereby prey may exit the enclosure cavity into an enclosed area for holding prey for removal from the trap. Said exit may be a break or hole in the enclosure material, thereby defining a mouth of an exit passageway continuing into the enclosed holding area. The exit passageway may also be equipped with means of preventing re-entry of the prey back into the trap; such means might include projections surrounding the mouth of the exit and oriented in such a fashion so as to protrude only down into the mouth of the exit and towards the enclosed holding area, to thereby prevent the prey from reversing its direction and re-entering the enclosure cavity.

Embodiments

In one embodiment, nylon netting is fitted with detachable hooks, each of which is arranged to attach to one of four external fiberglass support poles; each opposing end of said poles is attached near the junction of the net roof and the net floor, in such a manner so as to bow each flexible support pole into an essentially inverted "U" shape with the attached net roof hanging directly beneath.

In another configuration of the invention, the enclosure material (forming both an enclosure roof and a floor) is comprised of a closed-ended tube of flexible netting, attached beneath support poles having the shape of an essentially inverted "U", arranged in such a manner as to have a floorplan shaped like a curve, boomerang, or an essentially "L" shaped configuration. In this embodiment, the prey entrance may be situated in the inner crook of the curve, boomerang or "L" angle. The catch box may be situated outside the exterior crook of the curve, boomerang or "L" angle.

One particularly detailed embodiment is comprised of:
  a. nylon mesh flooring having an essentially "L" shaped floorplan in the shape of three essentially-rectangular adjacent quadrants, namely, one intermediate quadrant having one side of each of the remaining two quadrants aligned along a different essentially perpendicular side of said intermediate quadrant, said floorplan having a perimeter and intermediate floor area therein, said perimeter being comprised of two L-sides arranged cooperatively in an angular boomerang shaped design resembling two essentially parallel-aligned "L"s with connector sides connecting each end of each L-side with the corresponding end of the other parallel L-side, thereby forming a polygon,
    (1) one L-side of which is comprised of two essentially perpendicular legs each approximately 12 feet long, an end of each meeting at an end of the other to form an outer angle of said "L" floorplan,
    (2) the other L-side of which is comprised of two essentially perpendicular legs each approximately 7 feet long, an end of each meeting at an end of the other to form an inner angle of said "L" floorplan,
    (3) both of said connector sides having a length of approximately 5 feet,
  b. said floorplan perimeter having at least one support pole anchor means attached at each corner angle of said floorplan, and an additional support pole anchor means attached approximately midway along each of the longer L-legs, thereby having said support pole anchor means essentially located at each of the four corners of each of said three quadrants comprising said floorplan;
  c. at least three pairs of fiberglass support poles, each of which is comprised of
    (1) a plurality of sub-poles, removably connected end-to-end to another sub-pole by support pole connecting means,
    (2) each support pole of said pair being crisscrossed at approximately its center across the center of the other support pole,
    (3) each pole of which has one opposing end attached to a support pole attachment means located on a corner angle of an L-side of said floorplan perimeter, the other opposing end also being attached to a corresponding support pole attachment means located diagonally across said floorplan and on either a corner angle or midway along the other L-side of said floorplan perimeter, so as to essentially bow said support pole across said floorplan,
    (4) each of said bowed pairs of criss-crossed support poles thereby forming an essentially self-supporting unit when all of the respective support pole opposing ends are attached to support pole anchor means located at opposing corners of one of said quadrants of said floorplan perimeter;
  d. nylon mesh enclosure material having an essentially "L" shaped angular perimeter corresponding to and attached along said floorplan perimeter, said enclosure perimeter demarcating an intermediate enclosure area of enclosure material sufficient to provide for an essentially "L" shaped cavity when supported by said support poles, said enclosure means having
    (1) at least one 1-way-only entrance opening situated in an interior crook of said mesh forming said "L" shaped cavity, said opening comprising the mouth of an increasingly narrowing tunnel, providing prey with ingress into said cavity without exit,
    (2) a closeable opening of sufficient size to provide captured prey ingress to a prey catch box, and
    (3) a closeable opening slit of sufficient size to provide ingress and egress by humans; and
  e. attachment of said enclosure means at a plurality of sites to a plurality of said support poles by a plurality of attachment means, each attachment means comprised of a clamp apparatus capable of removeably clamping essentially anywhere along a support pole, together with a means of removeably fastening to said enclosure means and thereby attaching said enclosure means to said support pole.

The claims of this invention are to be read to include any legally equivalent device. Before the present invention is described in detail, it is to be understood that the invention is not limited to the particular configurations, process steps and materials disclosed herein. It is also to be understood that the terminology used herein is not intended to be limiting, since the scope of the present invention will be limited only by the claims and equivalents thereof. As used herein, the singular forms include the plurals, and vice versa, unless the context indicates otherwise or unless such construction would unintentionally limit rather that broaden the scope of the invention. Similarly, the conjunctive "and" may also be taken to include the disjunctive "or", and vice versa, for the sake of simplicity and whenever necessary to give the claims of this patent application the broadest interpretation and construction possible. Neither is the invention limited to the disclosed construction materials, to the extent that undisclosed equivalent materials satisfy the structural or functional requirements.

I claim:

1. An improved animal trap apparatus for capturing prey, said apparatus comprising:
   a. a nylon mesh flooring having an essentially "L" shaped floor plan in the shape of three essentially-rectangular adjacent quadrants, namely, one intermediate quadrant having one side of each of the remaining two quadrants aligned along a different essentially perpendicular side of said intermediate quadrant, said floor plan having a perimeter and intermediate area therein, said perimeter being comprised of two L-sides arranged cooperatively in an essentially angular boomerang shaped design resembling two essentially parallel-aligned "L"s with connector sides connecting each end of each L-side with the corresponding end of the other parallel L-side, thereby forming a polygon, one L-side of which is comprised of two essentially perpendicular legs each approximately 12 feet long, an end of each meeting at an end of the other to form an outer angle of said "L" floor plan, the other L-side of which is comprised of two essentially perpendicular legs each approximately 7 feet long, an end of each meeting at an end of the other to form an inner angle of said "L" floor plan, both of said connector sides having a length of approximately 5 feet;
   b. said floor plan perimeter having at least one support pole attachment means attached at each corner angle of said floor plan, and an additional support pole attachment means attached approximately midway along each of the longer L-legs, thereby having said support pole attachment means essentially located at each of the four corners of each of said three quadrants comprising said floor plan;
   c. at least three pairs of fiberglass support poles, each of which is comprised of a plurality of sub-poles, removably connected end-to-end to another sub-pole by support pole connecting means, each support pole of said pair being criss-crossed at its center across the center of the other support pole, each pole of which has one opposing end attached to a support pole attachment means located on a corner angle of an L-side of said floor plan perimeter, the other opposing end also being attached to a corresponding support pole attachment means located diagonally across said floor plan and on either a corner angle or midway along the other L-side of said floor plan perimeter, so as to essentially bow said support pole across said floor plan, each of said bowed pairs of criss-crossed support poles thereby forming an essentially self supporting unit when all of the respective support pole opposing ends are attached to support pole attachment means located at opposing corners of one of said quadrants of said floor plan perimeter;
   d. nylon mesh upper enclosure material having an essentially "L" shaped angular perimeter corresponding to and attached along said floor plan perimeter, said upper enclosure perimeter demarcating an intermediate area of enclosure material therein sufficient to provide for an essentially "L" shaped cavity when supported by said support poles, said enclosure material having
      (1) at least one 1-way-only entrance opening situated in an interior crook of said mesh forming said "L" shaped cavity, said opening comprising a mouth of an increasingly narrowing tunnel providing prey with ingress into said cavity without exit,
      (2) a closeable opening of sufficient size to provide captured prey ingress to a detachable prey catch box attached thereto,
      (3) a closeable human entrance means to provide ingress and egress by humans; and
   e. attachment of said upper enclosure means at a plurality of sites to a plurality of said support poles by a plurality of attachment means, each attachment means comprised of a clamp apparatus capable of removeably clamping essentially anywhere along a support pole, together with a means of removeably fastening to said upper enclosure means and thereby attaching said upper enclosure means to said support pole.

* * * * *